Oct. 9, 1923.
H. P. KRAFT
TIRE VALVE
Original Filed Oct. 7, 1919
1,469,927
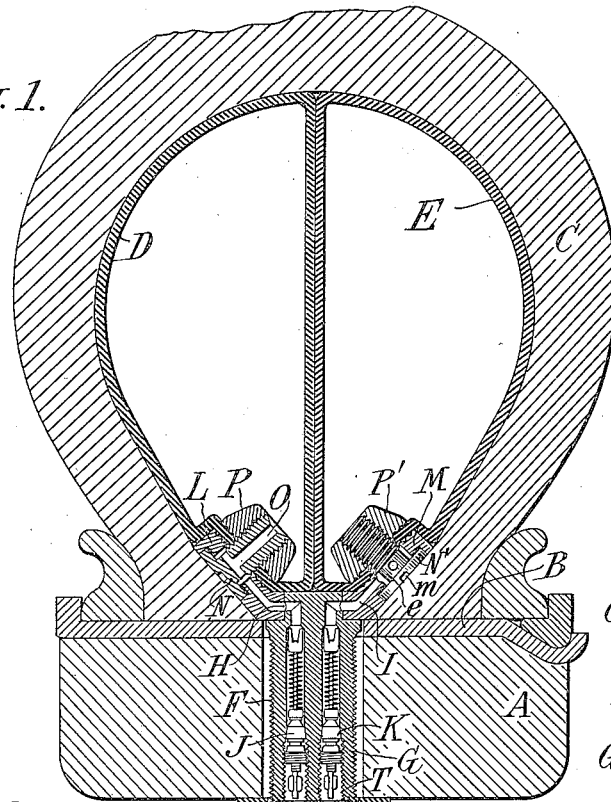
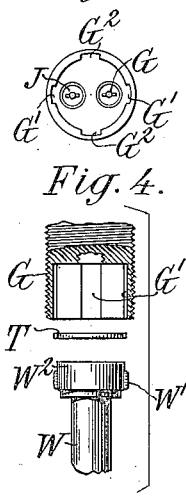
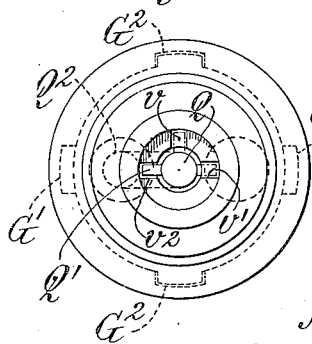
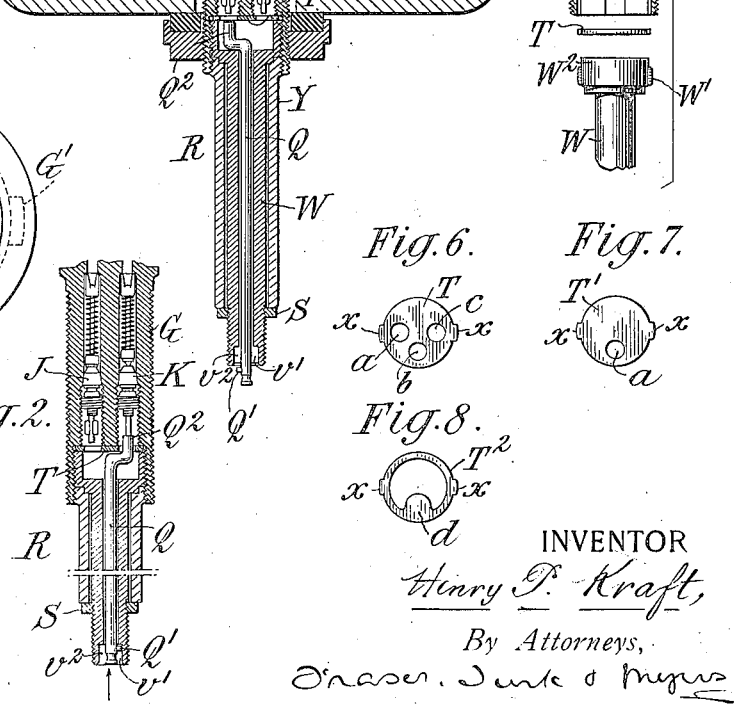
INVENTOR
Henry P. Kraft,
By Attorneys,
WITNESS:

Patented Oct. 9, 1923.

1,469,927

UNITED STATES PATENT OFFICE.

HENRY P. KRAFT, OF RIDGEWOOD, NEW JERSEY.

TIRE VALVE.

Application filed October 7, 1919, Serial No. 329,088. Renewed December 13, 1922.

*To all whom it may concern:*

Be it known that I, HENRY P. KRAFT, a citizen of the United States of America, residing in Ridgewood, in the county of Bergen and State of New Jersey, have invented certain new and useful Improvements in Tire Valves, of which the following is a specification.

This invention relates to tire valves for use in connection with tires having double air tubes, that is to say, two or more tubes or two or more inflation chambers. This type of tire usually consists of two air tubes and an outer shoe or casing, one of the tubes permitting inflation of the tire if the other becomes punctured. In certain constructions of this type the two tubes are laid in the casing side by side. Another construction has one tube with a central partition dividing it into two inflation chambers. The present invention provides a double valve for inflating either or both tubes, or in the latter type of tire, either or both inflation chambers.

My invention provides a valve shell or casing having two air ducts, each of which is governed by a separate check valve, the passages leading to a T-foot, one of which is adapted to be connected to one air tube (or tube chamber) and the other of which is adapted to be connected to the second tube (or chamber), and an extension carrying a deflating means, and adapted to be connected with the valve shell or casing.

The invention also includes certain other features of improvement which will be hereinafter more fully described.

Referring to the drawings which illustrate one form of the invention,—

Figure 1 is a cross-sectional view of a tire and rim showing the valve in longitudinal mid-section;

Fig. 2 is a similar section of the valve and extension showing the deflator in its active position;

Fig. 3 is an end view of the valve, enlarged;

Fig. 4 is a part sectional view of the inner portion of the extension and the lower portion of the valve casing;

Fig. 5 is an end view of the valve casing with the extension removed;

Figs. 6, 7 and 8 are plan views of different forms of washers which may be used in conjunction with the valve.

In describing the construction shown, the positions of the parts will be stated with respect to the arrangement shown in the drawing, where the valve is illustrated as at the upper side of the wheel.

Referring to the drawings, A indicates a wheel felloe, B a rim, C a tire shoe or casing, and D, E the two inner tubes, or tube chambers, arranged within the casing, such tubes being arranged side by side, both being shown as inflated.

F indicates the tire valve as a whole, comprising a shell or casing G formed with two bores or air ducts H and I. These bores are controlled or governed by separate check valves or "valve-insides" J and K respectively. The valve is formed on its upper end with foot portions L and M, arranged angularly to the body of the shell so that their outer faces fit the inner sides of the tire beads and constitute a bridge washer or spreader. Hollow clamping screws N and N' pass through the feet L and M respectively and carry heads or nuts P and P', formed as truncated cones, which are circularly grooved at their bases to form a gripping face which acts in conjunction with similar grooves on the feet L and M to clamp the respective inner tubes between them. The screws N and N' are each nicked to receive a screw-driver, and are perforated by T-shaped bores O which form a continuous air passage into the respective tubes from the valve ducts. In securing the tubes to the valve, the nuts P P' are loosened, the tubes are perforated and the loosened nuts slipped through the perforations which close against the sides of the screws N N'. The nuts are then clamped tightly against the feet of the valve by turning the screws N N' through the screw heads m. W is an extension of the casing having a longitudinal bore and an enlarged foot portion W² with ears W' and carrying a valve deflator Q. A retaining means of any desirable form, designated by Y, may be employed to rigidly secure the extension to the valve casing. The outer end of the extension W is constructed to receive a gauge which when applied pushes in the deflator pin Q and opens the check valve, so that the air pressure may be gauged.

The deflator Q consists of a solid metal rod with a laterally-projecting foot portion $Q^2$, a head and a lug Q' located near its lower end, and is mounted slidably in the extension W. The extension portion W is placed within the lower portion of the valve casing, the ears W' fitting into grooves or notches G', G'. The retaining means Y is then screwed into the casing by means of threads on its outer surface engaging threads on the inner surface of the valve casing. A threaded ring or nut S is then screwed into position, engaging threads formed on the end portion of W, which threads also receive the valve cap and the pump coupling. The lower end of W of formed with three slots, V, V' $V^2$, placed at right angles to each other, which receive the lug Q' of the deflator Q, as shown in Fig. 3. When the lug Q' is in the slot V, the foot portion of the deflator is over the solid portion of the valve casing, so that the deflator is inoperative. When turned and inserted in slots V', $V^2$, it is brought into position over the valves K and J respectively, from which positions it is pressed up to displace the stem of the valve to be opened, as shown in Fig. 2. T represents a washer which is adapted to be placed in the valve casing and held in position by ears x x coinciding with the grooves or notches G', G'.

When one of the tubes becomes punctured and deflated, the remaining intact tube is expanded by the compressed air within it, and conforms itself to the shape of the casing, so that it remains inflated at half pressure. A tire gauge is then used to determine which tube is punctured, and to take a pressure reading of the intact tube, the extension is then removed and one of the washers T inserted to blank off the duct leading to the deflated tube. One form of washer T is formed with three holes a, b and c, as shown in Fig. 6, and can be carried permanently in the valve, with the holes b and c in coincidence with the valve ducts. This washer is lifted and given a quarter turn, in order to cover one of the valves with the blank portion. For this purpose additional grooves or notches $G^2$, $G^2$ are provided to receive the ears of the washer. Thus, when it is desired to inflate only one tube, the valve leading to the other may be entirely cut off from the inflowing air. The washer T' in Fig. 7 has one hole a. The washer $T^2$ in Fig. 8 has a larger opening, with an uncut portion d on one side for blanking off one valve passage. These washers are designed to be used in place of that shown in Fig. 6. The washer is dropped into place with the hole or cut out portion over the valve to be used and the blank or solid portion covering the valve to be disconnected.

In use, when one of the tubes or inflation chambers is punctured or blown out, the valves are tested by a gauge in order to locate the intact tube and ascertain the amount of pressure contained therein. The extension is then removed and the valve leading to the punctured tube is blanked off by the washer, and the extension replaced. The intact tube may be then inflated to the desired pressure, thus eliminating the need for replacement of the inner air tube until it becomes convenient. The washer T is placed in position, so that both valves are open to inflation, and after deflation of one tube is moved so that the valve leading to the deflated tube is blanked off. During use with both tubes the washer is kept in position to open both valves, so that the deflator may be used for gauging purposes or renewal of the air supply to both tubes.

The pin Q is herein called a "deflator" because it performs the function of other parts so called in the art, although its normal function is not to deflate the tire tube, but merely to open the air valve to permit the pressure therein to communicate with the interior of a tire gauge.

It will be understood that, while I have described and illustrated the preferred form of the invention, I do not wish to be limited thereto since various changes may be made therein without departing from the spirit of the invention. While the invention has been shown as applied to double air tubes, it is understood that it is as readily applicable to tires having a plurality of air tubes.

I claim as my invention:—

1. A tire valve for a plurality of air tubes, comprising a casing having a plurality of ducts connecting with the respective tubes and check valves in the respective ducts, and a deflator adapted to engage either check valve.

2. A tire valve for a plurality of air tubes, comprising a casing having a plurality of ducts connecting with the respective tubes and check valves in the respective ducts, and a deflator adapted to engage either check valve, with guiding means for directing the deflator into engagement with one valve or the other.

3. A tire valve for a plurality of air tubes, comprising a casing having a plurality of ducts connecting with the respective tubes and check valves in the respective ducts, and a deflator adapted to engage either check valve, said casing having an extension carrying said deflator.

4. A tire valve for a plurality of air tubes, comprising a casing having a plurality of ducts connecting with the respective tubes and check valves in the respective ducts, and a deflator adapted to engage either check valve, said casing having an extension with a longitudinal bore housing said deflator and in which it is movable.

5. A tire valve for a plurality of air tubes, comprising a casing having a plurality of ducts connecting with the respective tubes and check valves in the respective ducts, and a deflator adapted to engage either check valve, an extension fitting said casing, carrying said deflator, and means for detachably fastening the extension to the casing.

6. A tire valve for a plurality of air tubes, comprising a casing having a plurality of ducts connecting with the respective tubes and check valves in the respective ducts, and a deflator adapted to engage either check valve, an extension carrying said deflator, having an enlarged foot portion, and an outer member screwing to the casing and engaging said foot portion to fasten the extension to the casing.

7. A tire valve for a plurality of air tubes, comprising a casing having a plurality of ducts connecting with the respective tubes and check valves in the respective ducts, and a deflator adapted to engage either check valve, with guiding means for directing the deflator into engagement with one valve or the other, said means comprising a projection on the deflator, and a guiding notch in the casing.

8. A tire valve for a plurality of air tubes, comprising a casing having a plurality of ducts connecting with the respective tubes and check valves in the respective ducts, and a deflator adapted to engage either check valve, said casing having an extension with a longitudinal bore housing said deflator and in which it is movable, and guiding means for the deflator, comprising notches in said extension and a projection on the deflator adapted to enter one of said notches.

9. A tire valve for a plurality of air tubes, comprising a casing having a plurality of ducts connecting with the respective tubes and check valves in the respective ducts, and a deflator adapted to engage either check valve, said casing having an extension with a longitudinal bore housing said deflator and in which it is movable, said extension having notches at its outer end, and said deflator having a laterally-projecting foot portion and a projection at its outer end, said foot portion adapted to engage with either of said check valves and said projection adapted to enter the corresponding one of said notches to guide the deflator.

10. A tire valve for double air tubes comprising a casing having two ducts connecting with the respective tubes and check valves in the respective ducts, means for closing off either duct comprising a washer having a solid portion to coincide with such duct and an opening to coincide with the open duct, and means for confining such washer in the casing, and a deflator movable to engage the valve in the open duct.

11. A tire valve for double air tubes comprising a casing having two ducts connecting with the respective tubes and check valves in the respective ducts, means for closing off either duct comprising a washer having a solid portion to coincide with such duct and an opening to coincide with the open duct, the casing and washer having reciprocally-engaging means for holding the washer in place, and a deflator movable to engage the valve in the open duct.

12. A tire valve for double air tubes comprising a casing having two ducts connecting with the respective tubes and check valves in the respective ducts, means for closing off either duct comprising a washer having a solid portion to coincide with such duct and an opening to coincide with the open duct, the casing having notches and the washer having a projection entering such notches to hold the washer in either position.

13. A tire valve for double air tubes comprising a casing having two ducts connecting with the respective tubes and check valves in the respective ducts, means for closing off either duct comprising a washer having a solid portion to coincide with such duct and an opening to coincide with the open duct, the washer movable to different rotative positions and adapted according to its position to close off either duct, or neither duct, and means for holding the washer in place in either position.

14. A tire valve for double air tubes comprising a casing having two ducts connecting with the respective tubes and check valves in the respective ducts, means for closing off either duct comprising a washer having a solid portion to coincide with such duct and an opening to coincide with the open duct, the washer movable to different rotative positions to close off either duct, or neither duct, and the casing having a plurality of notches and the washer having a projection entering such notches in the several positions of the washer, to prevent its rotative displacement.

15. A tire valve for double air tubes comprising a casing having a T-foot and two ducts leading through the respective branches to connect with the respective tubes, check valves in the respective ducts, and connecting means for joining either branch to an air tube comprising a screw passing through such branch into the tube and a clamping head within the tube engaged by said screw, whereby on turning the screw to draw down such head and clamp the tube against the branch.

16. In a tire valve, a means for connecting the foot of the tire casing to an air tube, comprising a screw passing through such foot into the tube, and a clamping head within the tube engaged by said screw, whereby on turning the screw to draw down the head and clamp the tube against the foot.

17. In a tire valve, a means for connecting the foot of the tire casing to an air tube comprising a screw passing through such foot into the tube, and a clamping head within the tube engaged by said screw, the screw having a head on the opposite side of the foot, and formed with a duct communicating from the valve duct in the valve casing to the air tube.

In witness whereof, I have hereunto signed my name.

HENRY P. KRAFT.